3,172,896
3-AMINOETHERS OF 5-ANDROSTENES

Fred Kagan and Norman A. Nelson, Kalamazoo, Mich., assignors to The Upjohn Company, Kalamazoo, Mich., a corporation of Delaware
No Drawing. Filed May 1, 1963, Ser. No. 277,138
7 Claims. (Cl. 260—397.4)

This invention relates to novel 3-(N-substituted)amino ether steroids and is more particularly concerned with 3β-[2-(2-hydroxyethylamino)-ethoxy]-5-androsten - 17 - one and 3β-(2-[bis(2-hydroxyethyl)amino]-ethoxy) - 5 - androsten-17-one, the mineral acid salts thereof, such as the hydrochloride, hydrobromide, bisulfate, dihydrogen phosphate salts and the methods of production thereof.

The novel compounds of this invention (as hydrochloride salts) and the methods of their production can be illustratively represented by the following sequence of formulae:

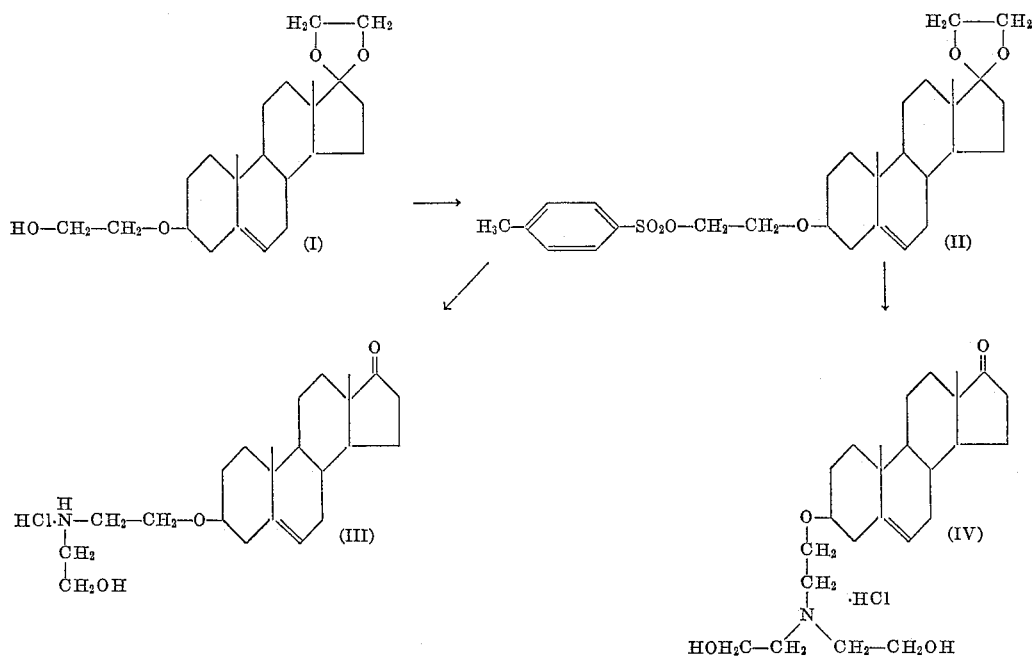

The process of production of the novel compounds of structures (III) and (IV) comprises: treating 3β-(2-hydroxyethoxy)-5-androsten-17-one, 17-cyclic ethylene acetal (I) with p-toluenesulfonyl chloride to obtain the ester, 3β-(2-hydroxyethoxy)-5-androsten-17-one 17-cyclic ethlene acetal, p-toluenesulfonate (II); treating (II) with monoethanolamine and subsequently with hydrochloric acid to give 3β-[2-(2-hydroxyethylamino)-ethoxy]-5-androsten-17-one hydrochloride (III); or treating compound (II) with diethanolamine followed by hydrochloric acid to obtain 3β-(2-[bis(2-hydroxyethyl)amino]ethoxy) - 5-androsten-17-one hydrochloride.

The novel compounds which can be presented by the formula

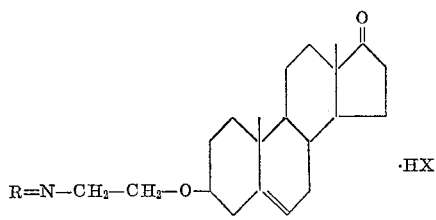

wherein R is selected from the group consisting of

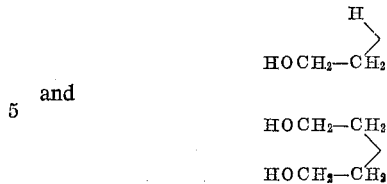

and X is the acid residue of a mineral acid, such as Cl, Br, —HSO₄, —H₂PO₄ and the like have hypocholesteremic activity. The compounds are thus useful in the treatment of atherosclerosis which is a form of arterio sclerosis which is characterized by fatty degeneration occurring in the arterial walls, by the mechanism not yet definitely established. Hypercholesteremia refers essentially to an excess of cholesterol in the blood serum. While the causes of hypercholesteremia and the nature of its role in atherosclerosis and related conditions is not clearly understood, considerable effort has been directed

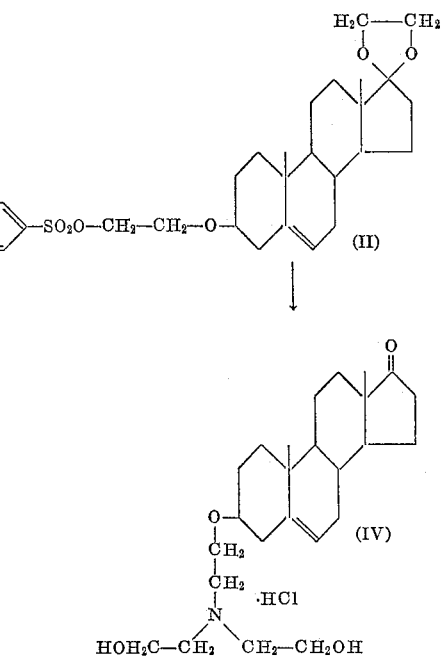

toward reducing blood and tissue cholesterol levels as an attack upon the clinical conditions in which high levels are implicated. It has long been recognized that certain substances such as sitosterol, corn oil, nicotinic acid, etc., are capable of reducing in small degree the blood and tissue cholesterol contents, either by interfering with the absorption of exogenous cholesterol introduced with food, or by facilitating the removal of cholesterol from the body. Major emphasis, however, has been placed on the search for compounds which will interfere with the production of endogenous cholesterol by the liver and hence offer a more positive means of control of cholesterol levels.

The novel compounds of the present application significantly reduce the cholesterol content of both blood and tissue by partially arresting the biosynthesis of cholesterol in the body.

The compounds also act as analgetics and anti-convulsants and can thus be used for treatment of diseases of birds, and mammals.

The compounds furthermore have activity against the eggs and larvae of common animal parasites and can be thus used in sprays or powders for cattle and poultry or can be incorporated into animal bedding, to prevent parasitic diseases.

The starting compound (I) for this invention, 3β-(2-hydroxyethoxy)-5-androsten-17-one, 17 - cyclic ethylene acetal, is a known compound (S. Julia et al., Bull. Soc. Chim. France, 297 [1960]).

The process of production of the compounds of the structures (III) and (IV) essentially comprises the following steps: preparation of an organic sulfonic acid ester of 3β-(2-hydroxyethoxy)-5-androsten-17-one, 17-cyclic ethylene acetal (I) by reacting compound (I) with an organic sulfonyl halide such as p-toluenesulfonyl chloride, methanesulfonyl chloride, benzenesulfonyl bromide, p-ethylbenzenesulfonyl chloride, m-chlorobenzenesulfonyl chloride, ethanesulfonyl chloride, propanesulfonyl chloride and the like in a suitable organic solvent such as pyridine, methylpyridines with or without cosolvents such as tetrahydrofuran and the like. Under preferred conditions, the organic sulfonyl halide is used in excess, the mixture is stirred in a nitrogen atmosphere, and the reaction is carried out at temperatures between 15 and 40°. However, higher or lower temperatures are operative for this reaction. The thus-obtained ethers, which when p-toluenesulfonyl chloride is used as reagent has the structure of Formula II, is recovered from the reaction mixture by extraction with water-insoluble organic solvents, such as methylene chloride, ethylene chloride, ether and the like and is isolated and purified by standard methods, e.g., washing the extracts with water, aqueous acid and aqueous bases as necessitated and finally by evaporating the remaining organic solution and crysallizing the obtained residues from organic solvents such as acetone, methyl alcohol, ethyl alcohol and the like.

Compound (II), 3β-(2-hydroxyethoxy)-5-androsten-17-one, 17-cyclic ethylene acetal, p-toluenesulfonate is converted to 3β-[2-(2-hydroxyethylamino)-ethoxy]-5-androsten-17-one hydrochloride (III) by reacting compound (II) with monoethanolamine. The ethanolamine is used in large excess constituting both the solvent and the reactant. In the preferred embodiment of the invention the reaction is carried out under stirring at a temperature between 15 and 40° for a period between 30 minutes and 96 hours and is then followed up by heating on the steam bath for a period of 30 minutes to 24 hours. Thereafter the reaction mixture is extracted with water-insoluble agents such as ether, methylene chloride, ethylene dichloride, and the like and the organic layers preferably washed with water and concentrated. The crystalline residues thus obtained are treated with a selected acid, usually in an ethereal alcoholic solution. The thus-obtained salt of 3β-[2-(2-hydroxyethylamino)-ethoxy]-5-androsten-17-one is isolated and purified by standard methods, e.g., filtration, washing with suitable organic agents and recrystallization.

The compound of structure (IV), 3β-(2-[bis(2-hydroxyethyl)-amino]-ethoxy)-5-androsten-17-one mineral acid salts, preferably the hydrochloric acid salt, is prepared in the same general manner as compound (III) except that instead of monoethanolamine, diethanolamine is used. The reaction time for the diethanolamine is generally somewhat longer than for the monoethanolamine. Further details of this reaction and of isolation and purification of the desired compounds are shown in the examples.

EXAMPLE 1

*3β-(2-hydroxyethoxy)-5-androsten-17-one, 17-cyclic ethylene acetal, p-toluenesulfonate*

A mixture of 10.0 g. of 3β-(2-hydroxyethoxy)-5-androsten-17-one, 17-cyclic ethylene acetal, 6.0 g. of p-toluenesulfonyl chloride and 25 ml. of dry pyridine was stirred in a nitrogen atmosphere until it became homogeneous. This took approximately 5 minutes. The mixture was then allowed to stand at room temperature (22 to 25° C.) for 7 hours. The mixture was thereupon cooled in an ice bath and 2.5 ml. of water was added with stirring. After 45 minutes of stirring the mixture was diluted with methylene chloride and ether (in a ratio of 1:2) and the organic solution was washed with 400 ml. of ice water containing 30 ml. of concentrated hydrochloric acid. After separating the water from the mixture, the organic solution was immediately washed with water, sodium bicarbonate and water again and was thereupon dried over anhydrous sodium sulfate. The organic solvent was removed in vacuo to give a residue which was recrystallized from acetone to give 6.2 g. of 3β-(2-hydroxyethoxy)-5-androsten-17-one, 17-cyclic ethylene acetal, p-toluenesulfonate. After two additional recrystallizations of the product from acetone pure 3β-(2-hydroxyethoxy)-5-androsten-17-one, 17-cyclic ethylene acetal, p-toluenesulfonate was obtained having a melting point of 120.5 to 121.5°, rotation $[\alpha]_D$ —50° (C. 0.932) in chloroform and having an analysis as follows:

*Analysis.*—Calcd. for $C_{30}H_{42}O_6S$: C, 67.90; H, 7.98; S, 6.03. Found: C, 67.89; H, 8.11; S, 6.07.

By substituting for toluenesulfonyl chloride in the reaction of Example 1, methanesulfonyl chloride, ethanesulfonyl chloride, benzenesulfonyl chloride, p-ethylbenzenesulfonyl chloride, and the like, the corresponding esters are obtained, namely the methanesulfonate, the ethanesulfonate, the benzenesulfonate, the p-ethylbenzenesulfonate, and the like of 3β-(2-hydroxyethoxy)-5-androsten-17-one, 17-cyclic ethylene acetal.

EXAMPLE 2

*3β-[2-(2-hydroxyethylamino)ethoxy]-5-androsten-17-one hydrochloride*

A mixture of 6 g. of 3β-(2-hydroxyethoxy)-5-androsten-17-one, 17-cyclic ethylene acetal, p-toluenesulfonate and 50 ml. of monoethanolamine was stirred at room temperature for a period of 2 days and then heated on the steam bath for 7 hours. To the mixture was then added 100 ml. of water and 150 ml. of ether: methylene chloride (2:1). This mixture was shaken, the water layer discarded and the organic layer was washed repeatedly with water, dried over anhydrous sodium sulfate and finally concentrated. The crystalline residue was then dissolved in a solution consisting of 60 ml. of methanol, 20 ml. of water and 6 ml. of concentrated hydrochloric acid and stirred at room temperature for 2 hours. To this mixture was then added 75 ml. of methylene chloride and 10% dilute sodium hydroxide solution until basic. This mixture was shaken, the organic amino layer separated, dried over anhydrous sodium sulfate and concentrated in vacuo to give 3β-[2-(2-hydroxyethylamino)-ethoxy]-5-androsten-17-one. The thus-obtained aminoether was thereupon redissolved in cold ether under stirring and treated with an excess of gaseous hydrogen chloride. The precipitate which was thus formed was recovered by filtration and dried to give 3.2 g. of 3β-[2-(2 - hydroxyethylamino) - ethoxy] - 5 - androsten - 17-one, hydrochloride which upon recrystallization from chloroform had a melting point of 221 to 224° C., a rotation of $[\alpha]_D$ +9° (c. 0.943) in chloroform and an analysis as follows:

*Analysis.*—Calcd. for $C_{23}H_{38}ClNO_3$: C, 67.05; H, 8.95; Cl, 8.61. Found: C, 66.63; H, 8.95; Cl, 8.92.

Repeated recrystallization of 3β-[2-(2-hydroxyethylamino)-ethoxy]-5-androsten-17-one, as obtained above, from Skellysolve B hexanes and ether gives the pure, solid free aminoether in crystalline form.

In the same manner as shown in Example 2 for the production of the hydrochloride of 3β-[2-(2-hydroxyethylamino)-ethoxy]-5-androsten-17-one, the hydrobromide can be synthesized by substituting hydrochloric acid with sulfuric acid using gaseous hydrogen bromide instead of gaseous hydrogen chloride to precipitate the salt from the ethereal solution.

The phosphate of 3β-[2-(2-hydroxyethylamino)-ethoxy]-5-androsten-17-one can be obtained by reacting the hydrochloride with the calculated amount of silver dihydrogen phosphate and eliminating by filtration the thus produced water-insoluble silver chloride, concentrating the aqueous solution in vacuo until 3β-[2-(2-hydroxyethylamino)-ethoxy]-5-androsten-17-one phosphate precipitates and purifying it by repeated crystallization from water and aqueous ethanol.

EXAMPLE 3

3β-(2-[bis(2-hydroxyethyl)amino]ethoxy)-5-androsten-17-one, hydrochloride

A mixture of 3.65 g. of 3β-(2-hydroxyethoxy)-5-androsten-17-one, 17-cyclic ethylene acetal, a p-toluenesulfonate, 20 ml. of diethanolamine and 15 ml. of tetrahydrofuran was stirred at room temperature for a period of three days and then heated on the steam bath for a period of 24 hours. The reaction mixture was diluted with water and extracted with ether-methylene chloride (2:1). The ether extract was washed, dried over anhydrous sodium sulfate and concentrated in vacuo. The crystalline residue thus obtained was mixed with 30 ml. of methanol, 5 ml. of water and 3 ml. of concentrated hydrochloric acid and stirred at room temperature (24°) for a period of 2 hours. The mixture was then shaken with methylene chloride and dilute sodium hydroxide solution, the organic layer separated, dried over anhydrous sodium sulfate and concentrated in vacuo to give 3β-(2-[bis-(2-hydroxyethyl)amino] - ethoxy) - 5 - androsten-17-one. This material was redissolved in cold ether under stirring and was treated with an excess of gaseous hydrogen chloride. The resulting precipitate was collected, filtered and dried to give 2.95 g. of 3β-(2-[bis(2-hydroxyethyl)amino]ethoxy)-5-androsten-17-one, hydrochloride, M.P. 118–190° C. The thus-obtained 3β-(2-[bis(2-hydroxyethyl)amino]ethoxy)-5-androsten - 17 - one, hydrochloride was four times recrystallized from a mixture (1:1) of tetrahydrofuran-methylene chloride to give the pure product having a melting point of 190 to 191° C., a rotation $[\alpha]_D$ +11° (c. 0.943) in chloroform and an analysis as follows:

*Analysis*—Calcd. for $C_{25}H_{42}ClNO_4$: C, 65.84; H, 9.28; Cl, 7.77; N, 3.07. Found: C, 64,80, 64.86; H, 9.38, 9.21; Cl, 7:73; N, 3.01.

In order to obtain 3β-(2[bis-2-(hydroxyethylamino]-ethoxy)-5-androsten-17-one in pure, crystalline form the free amine obtained, obtained in Example 3, can be recrystallized from Skellysolve B hexanes and ether.

Substituting in Example 3 the hydrochloric acid with hydrobromic acid and the hydrogen chloride with hydrogen bromide results in the isolation of the hydrobromide of 3β-(2-[bis(2-hydroxyethyl)amino]ethoxy)-5-androsten-17-one.

The phosphate of 3β-(2-[bis(2-hydroxyethyl)amino]-ethoxy)-5-androsten-17-one can be obtained by either treating the hydrochloride with silver dihydrogen phosphate as shown above in Example 2 or by treating the free amine, 3β-(2-[bis(2-hydroxyethyl)amino]ethoxy)-5-androsten-17-one with the calculated amount of phosphoric acid and recrystallizing the resulting mixture from tetrahydrofuran-methylene chloride.

Treating a tetrahydrofuran solution of the free base 3β-(2 - [bis(2 - hydroxyethyl)amino]ethoxy)-5-androsten-17-one with the theoretical amount of sulfuric acid and recrystallizing the product several times from tetrahydrofuran-methylene chloride results in the sulfate of 3β-(2-[bis(2-hydroxyethyl)amino]ethoxy)-5-androsten-17-one.

In similar manner, as shown in Example 3, using instead of the toluenesulfonate the methanesulfonate, ethanesulfonate, benzenesulfonate, p-ethylbenzenesulfonate, β-chlorobenzenesulfonate and the like of 3β-(2-hydroxyethoxy)-5-androsten-17-one, 17-cyclic ethylene ketal, results in the hydrochloride of 3β-(2-[bis(2-hydroxyethyl)amino]ethoxy)-5-androsten-17-one.

Compounds (III) and (IV) lower the blood cholesterol level in rats by 45%.

We claim:

1. A 3-(N-substituted)-aminoether steroid having the structural formula

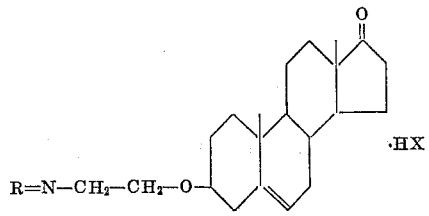

wherein R is selected from the group consisting of

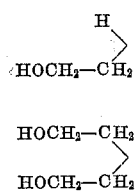

and $$\begin{array}{c}HOCH_2-CH_2\\ \diagdown\\ HOCH_2-CH_2\end{array}$$

and X is the acid residue of a mineral acid.

2. 3β-[2-(2-hydroxyethylamino)ethoxy] - 5-androsten-17-one, hydrochloride.

3. 3β - (2-[bis(2-hydroxyethyl)amino]ethoxy) -5- androsten-17-one, hydrochloride.

4. A process for the production of 3-(N-substituted) amino ether steroids of the formula:

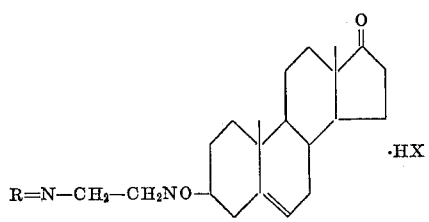

wherein R is selected from the group constituting of

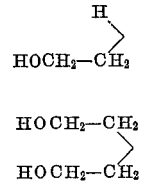

and $$\begin{array}{c}HOCH_2-CH_2\\ \diagdown\\ HOCH_2-CH_2\end{array}$$

and X is the acid residue of a mineral acid which comprises: treating 3β-(2-hydroxyethoxy)-5-androsten-17-one 17-cyclic ethylene acetal with an organic sulfonic acid halide to obtain the corresponding organic sulfonate ester of 3β-(2-hydroxyethoxy)-5-androsten-17-one 17-cyclic ethylene acetal, treating the thus-obtained sulfonate with an ethanolamine selected from the group consisting of mono- and diethanolamine and subsequently with an aqueous mineral acid to give the corresponding 3-(N-substituted) aminoether steroid salt of the above formula.

5. A process according to claim 4 for the production of 3β-[2-(2-hydroxyethylamino)ethoxy]-5-androsten-17-one hydrochloride, wherein 3β-(2-hydroxyethoxy)-5-androsten-17-one, 17-cyclic ethylene acetal is treated with p-toluenesulfonyl chloride, and the thus-produced p-toluenesulfonate is treated with monoethanolamine followed by hydrochloric acid.

6. A process according to claim 4 for the production of 3β-(2-[bis(2-hydroxyethyl) amino] ethoxy)-5-androsten-17-one hydrochloride, wherein the 3β-(2-hydroxyethoxy)-5-androsten-17-one, 17-cyclic ethylene acetal is treated with p-toluenesulfonyl chloride, and the thus-produced p-toluenesulfonate is treated with diethanolamine followed by hydrochloric acid.

7. A process for the production of 3-(N-substituted) aminoether steroids of the formula

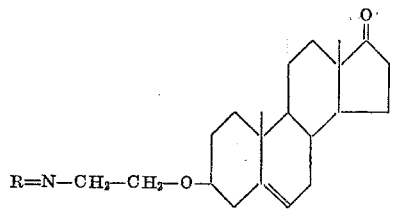

wherein R is selected from the group consisting of

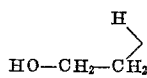

and

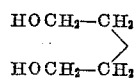

which comprises: treating 3β-(2-hydroxyethoxy)-5-androsten-17-one 17-cyclic ethylene acetal with an organic sulfonic acid halide to obtain the corresponding organic sulfonate ester of 3β-(2-hydroxyethoxy)-5-androsten-17-one 17-cyclic ethylene acetal, treating the thus-obtained sulfonate with an ethanolamine selected from the group consisting of mono- and diethanolamine to give the corresponding 3-(N-substituted) aminoether steroid of the above formula.

References Cited in the file of this patent
UNITED STATES PATENTS

| | | |
|---|---|---|
| 2,906,758 | Kincl et al. | Sept. 29, 1959 |
| 3,016,390 | Counsell | Jan. 9, 1962 |
| 3,035,068 | Bowers et al. | May 15, 1962 |
| 3,094,541 | Cantrall et al. | June 18, 1963 |

OTHER REFERENCES

Gordon et al.: Biochem. and Biophys. Res. Comm., vol. 6, No. 5, pp. 359–363 (1961).